United States Patent [19]

Malinowski

[11] 4,075,499

[45] Feb. 21, 1978

[54] SMOKE DETECTOR WITH MEANS FOR CHANGING LIGHT PULSE FREQUENCY

[75] Inventor: William J. Malinowski, Pembroke, Mass.

[73] Assignee: Chloride, Incorporated, Tampa, Fla.

[21] Appl. No.: 742,194

[22] Filed: Nov. 16, 1976

[51] Int. Cl.[2] .............................................. G01N 21/26

[52] U.S. Cl. ................................. 250/574; 340/237 S

[58] Field of Search .................... 250/573, 574, 214 B; 340/237 S; 356/201, 204, 207

[56] References Cited

U.S. PATENT DOCUMENTS

| | | | |
|---|---|---|---|
| 3,711,210 | 1/1973 | Krukowski | 356/207 |
| 3,936,814 | 2/1976 | Muller-Girard | 340/237 S |
| 4,024,407 | 5/1977 | Meric | 250/574 |

*Primary Examiner*—David C. Nelms

*Attorney, Agent, or Firm*—Robert E. Ross

[57] ABSTRACT

A smoke detector operating on the reflected light principle, utilizing a pulsing light source and means requiring several consecutive pulses of light reflected from smoke to actuate an alarm. During normal standby operation, the light pulses at a predetermined slow rate, when smoke is present, the first pulse of light reflected from the smoke causes the time interval to the next pulse to increase, so that if smoke continues to be present, the number of reflected pulses required to actuate the alarm are received in a shorter time. The time to alarm is thereby shortened without increasing the current drain of the device and without shortening the life of the pulsing light source.

4 Claims, 2 Drawing Figures

SMOKE DETECTOR WITH MEANS FOR CHANGING LIGHT PULSE FREQUENCY

BACKGROUND OF THE INVENTION

In smoke detectors of the reflected light type, in which a photo-responsive device is used to receive light from smoke particles illuminated by a light source, one of the major problems has been that of providing a light source which is capable of operating over a long period of time without failure. For this purpose, light emitting diodes have recently been utilized.

However, commercially available light emitting diodes have, at their rated current, insufficient light output to function as an effective smoke detector. However, it has been found that such a diode will produce light output adequate for smoke detection purposes if it is operated at a current considerably higher than the rated current specified by the manufacturer, but its life is so short at this higher current as to make its use in a commercial smoke detector impractical.

However, I have found that if the light emitting diode is energized at the higher current in short pulses, its light output and service life will be adequate for a continuously operating smoke detector.

A detector utilizing light emitting diodes in this manner is disclosed in U.S. Pat. No. 3,946,241 issued to me on Mar. 23, 1976. In the detector disclosed therein, the pulse to the light emitting diode has a duration of about 20 micro seconds, with the repetition rate being 1 pulse every 2 seconds. The detector described therein is designed to produce an alarm only if smoke is detected on two consecutive pulses.

However, it has been found desirable in some cases to increase the degree of immunity from false alarms, to require the detection of smoke by 4 or more pulses to produce an alarm, and it has also been found desirable to reduce the pulse repetition rate to, for example, 5 seconds, to increase the life of the light-emitting diode. However, the combination of these two modifications would result in an alarm response time of 15 seconds, which is an unacceptable length of time.

It has been suggested that on the detection of smoke by a pulse, the repetition rate could be increased, so that the required number of output pulses to produce the alarm would be produced in a shorter period of time. However, if there are no subsequent output pulses (such as when the first pulse is a result of a spurious response), the pulse rate would nevertheless continue at the high rate. This not only reduces the life of the light-emitting diode, but also increases the possibility of another false alarm being received during the period of increased pulse rate.

SUMMARY OF THE INVENTION

To increase the life of the light emitting diode by reducing the pulse repetition rate thereof without increasing the response time of the detector, I provide a novel means for shortening the time to the next light pulse after a light pulse has illuminated smoke present at the detector to produce an output response from the detection amplifier. If the second pulse also produces an output, the following pulse is caused to occur at the shortened interval, with the shortened pulse interval continuing as long as the preceding pulse has produced an amplifier output. If any pulse does not produce an amplifier output, the time interval to the following pulse returns to the longer standby interval.

In one embodiment of the invention, on each pulse to the light emitting diode, a shorter pulse is applied to a bi-stable switching device, to insure that the switching device cannot pass an output signal to an integrating device. The bi-stable switching device may be a flip-flop with the shorter pulse being applied to the re-set terminal thereof at the beginning of the pulse to the light emitting diode. If smoke is present during a first pulse, the resulting output occurring during the pulse to the light emitting diode but after the short pulse to the re-set terminal of the flip-flop, is fed to the set terminal of the flip-flop to cause an output pulse to appear at the pulse integrator. The output pulse from the flip-flop is also fed to a electronic switch, associated with the pulse generator, to change its condition so as to increase the pulse rate. The interval to the next or second pulse is thereby shortened.

On the second pulse, the initial short pulse to the re-set terminal of the flip-flop, in addition to turning off the output to the integrator, also returns the electronic switch to its former condition. Hence if no output signal is created by the second pulse, the interval to the following or third pulse returns to the original stand-by pulse interval; however, if an output signal is created by the second pulse, the interval to the third pulse, is also shortened.

BRIEF DESCRIPTION OF THE DRAWING

Referring to FIG. 1 of the drawing, there is illustrated an electronic circuit for use in a smoke detector operating on the reflected light principle.

Figure 1:
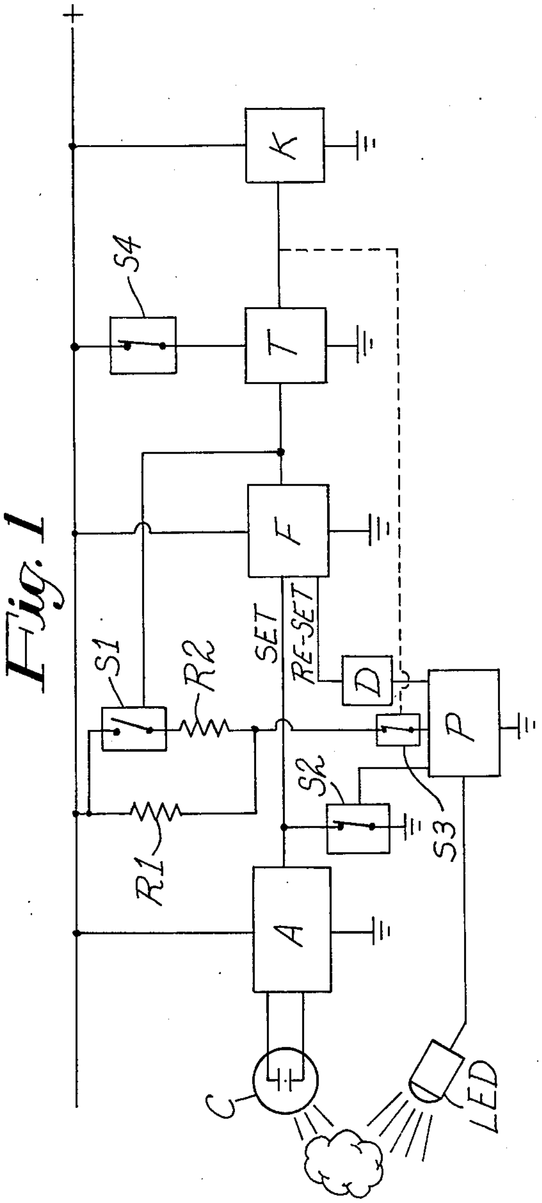
FIG. 1 is a schematic diagram of an electrical circuit for use in a smoke detector embodying the features of the invention.

Certain portions of the illustrated circuit are disclosed and claimed in U.S. Pat. No. 3,946,241 issued to me on Mar. 23, 1976.

The circuit includes a light-emitting diode LED and a photo-voltaic cell C positioned out of the direct line of the beam of light from the LED. In a preferred embodiment of the invention the cell C is positioned to view a portion of the beam in front of the LED at an angle of about 135° from the axis of the beam, to take advantage of the well known "forward scatter" effect.

The output of cell C is utilized as the input to amplifier A, the output of which is fed to the set terminal of a bi-stable switching device such as a flip-flop F.

The term "amplifier" is meant to include any required circuitry for transforming a signal from the cell C into a signal usable by the flip-flop, including any necessary stages of pre-amplification, and any means allowing an output therefrom only when the output signal reaches a predetermined level, such as a level detector. The flip-flop output is fed to an integrator T and to an electronic switch S1, which closes in response to the flip-flop output, for a purpose to appear hereinafter. The integrator T may have any desired time constant so that a predetermined number of pulses into the integrator are required to provide an output therefrom to the alarm K.

To provide a pulse of current to the LED and for other purposes to be described, a pulse generator P is provided, which connects to a power supply through a resistor R1. The electronic switch S1 and a resistor R2 are connected in parallel with the resistor R1. With the switch S1 open, the current to the pulse generator P has a value such that the pulse rate is, for example, 1 pulse every 5 seconds. When the switch S1 is closed, so that resistor R2 is in parallel with resistor R1, the increased current increases the pulse rate to 1 pulse every 0.2 seconds.

In addition to providing a pulse to the LED, the pulse generator also applies substantially simultaneously a pulse of substantially the same duration to a normally closed switch S2 to pulse it to the open condition for the duration of the pulse and a pulse to the set terminal of the flip-flop through discriminator D which converts the pulse to a spike at the beginning of the pulse cycle.

The switch S2 is connected between the output of the amplifier and ground, so that the amplifier output is shorted to ground except during the time that the switch S2 is pulsed open by the pulse generator.

The operation of the device can best be described by reference to FIG. 2, which is a graph of the response of the various components of the circuit during a pulse with a predetermined level of smoke present in the light beam. The horizontal scale represents time and the vertical scale represents response. The vertical scale units are arbitrary and the height on the vertical scale of the various curves have no relation to each other except as described hereinafter.

Each cycle begins with the application of a pulse from the pulse generator to the LED, the amplifier output clamp switch S2, and the re-set terminal of the flip-flop. The pulse to the LED and the switch S2 are both represented on the diagram by P1, since they are of the same duration. They may, of course, be of different magnitudes and different polarities.

The pulse appearing at the re-set terminal of the flip-flop after passing through the discriminator is represented by PD1, and insures that the flip-flop is turned off at the beginning of each pulse cycle. The application of the pulse to the LED produces a light output having a duration and relative intensity represented by curve V1.

If there is no smoke in the portion of the beam viewed by the cell C, there will be no pulse of voltage generated by the cell and hence no output from the amplifier, and at the end of the pulse P1 the LED is de-energized and the switch S2 again closes to clamp the amplifier output to ground.

Figure 2:
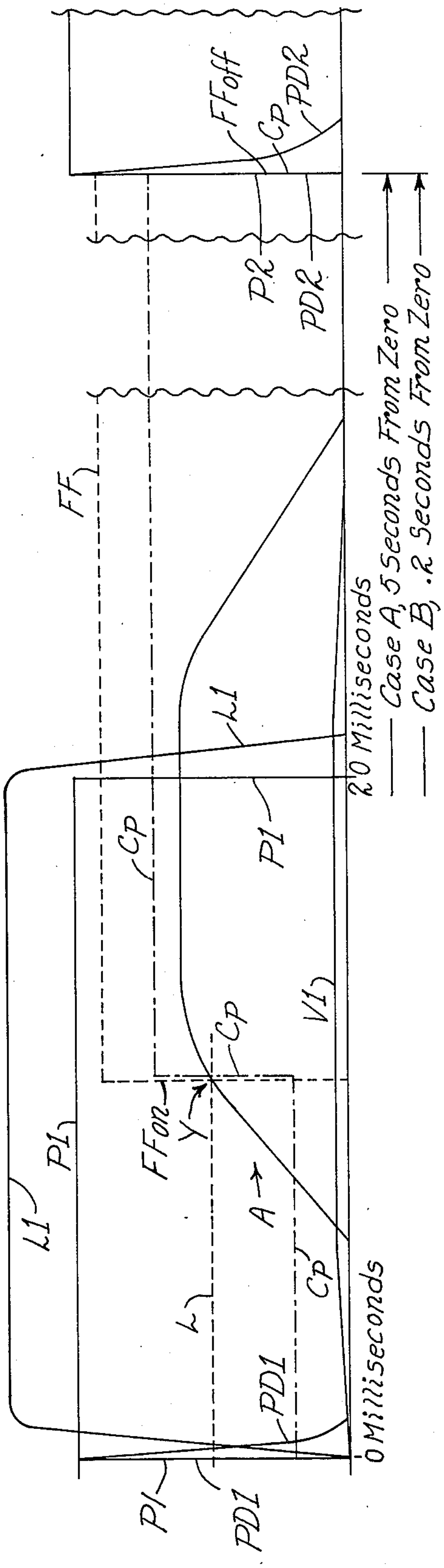
FIG. 2 is a diagram illustrating the time spacing of the pulses applied to the various components of FIG. 1.

However, if there is smoke present in the light beam, a pulse of voltage will be produced by the cell, represented by curve V1 of FIG. 2, which will be amplified by the amplifier to produce a signal at the set terminal of the flip-flop, provided that the amount of smoke is great enough to produce an output signal of the predetermined level. For example, it is common to allow an output signal, and hence an alarm, only when there is a predetermined concentration of smoke, such as 1 or 2%.

The percent smoke is usually defined as the amount of smoke that absorbs that percent of a light beam 1 foot long.

As illustrated in FIG. 2, the amplifier signal level necessary to allow an output to the flip-flop is represented by dashed horizontal line L. Adjustment means (not shown) may be provided in the amplifier to adjust the calibration of the system so that the alarm point will be at the desired smoke percentage.

If the amount of smoke viewed by the cell has reached the specified concentration, the amplifier output will be as shown in curve A reaching line L at point Y, thereby applying a signal to the flip-flop set terminal, thereby turning on the flip-flop output (illustrated by curve FF) and closing switch S1 to increase the current to the pulse generator (illustrated by curve $C_p$.

The output pulse from the flip-flop is stored in the integrator T. The increased current through the pulse generator P increases the pulse rate to a predetermined value, such as one pulse every 0.2 seconds or 5 pulses per second. As illustrated in FIG. 2, the pulse repetition rate during stand-by operation (case A) is 5 seconds, if smoke has not been detected. However, if smoke of the specified amount has been detected, as illustrated in FIG. 2, the time to the next pulse (P2) is reduced to 0.2 seconds (case B).

At the beginning of pulse P2, the LED is again energized, the switch S2 opened, and a spike pulse applied to the flip-flop re-set terminal. Hence at the beginning of the second pulse, the flip-flop output is turned off, so that the switch S1 opens, returning the pulse generator to its previous rate of one pulse per 5 seconds. Hence if the second pulse does not detect sufficient smoke to produce an output from the amplifier to the flip-flop, the pulse rate remains at the stand-by rate.

However, if the second pulse also detects smoke, the various components will react in the same manner as illustrated in FIG. 2 resulting from pulse P1, the pulse generator will again return to the faster rate, by reason of the second flip-flop output and a second pulse will be stored in the integrator.

Although the switch S1 opens at the beginning of each pulse, if smoke is detected during that pulse, the switch S1 closes again after about 10 microseconds (depending on the smoke concentration and the resulting rate of rise of the amplifier output, which determines the time at which curve A reaches level L).

Hence so long as each pulse detects smoke, the pulse generator will continue to run at the faster rate, since the open time of switch S1 is only about 10 micro-seconds out of 200,000 micro-seconds (0.2 minutes).

If the integrator T is designed to actuate the alarm R when the integrator has received 5 consecutive pulses, the alarm will be sounded in less than one second after the first pulse is received, even though the stand-by pulse rate is one every 5 seconds.

In one embodiment of the invention the pulses will continue to run at the faster rate until the smoke has cleared from the detector, at which time the alarm will shut off and the pulses will return to the stand-by rate.

However, in some systems utilizing the detector it may be desirable to lock the alarm into the energized condition when the required number of pulses are received by the integrator.

To prevent the pulser from continuing to run the LED at the increased rate until the alarm is manually de-energized, means may be provided to de-energize the pulser when the integrator produces an alarm actuation signal. For example, a switch S3 may be provided in the pulser circuit which is opened by the output signal from the integrator. Hence when the alarm sounds, the pulser is de-energized and remains de-energized until the signal from the integrator to the alarm is manually terminated by opening switch S4 in the integrator power supply line.

Although in the illustrated embodiment the normally closed switch S2 clamps the amplifier output signal to ground to prevent an output signal from the amplifier during the time that the LED is not energized, it will be understood that this switch may be positioned with equal effectiveness at other points in the system. The means for preventing the passage of a signal when the LED is not energized may be a normally open switch disposed in series in the amplifier output line which is pulsed closed when the LED is energized.

In U.S. No. 3,917,956 issued to me on Nov. 4, 1975, there is illustrated a smoke detector of the pulsing light type, in which means is provided for isolating the detector circuit from the power source when the LED is pulsed in the on condition, with the detector circuit, during this period being energized by a capacitor which is charged during the time when the LED is not energized, thereby avoiding possible false alarms from transient voltages on the power line occurring when the LED is on. This feature can be embodied in the smoke detector disclosed herein if desired.

Since other modifications apparent to one skilled in the art can be made in the illustrated embodiment of the invention without departing from the scope thereof, it is intended that all matter contained herein be interpreted in an illustrative and not a limiting sense.

I claim:

1. A detector, comprising a radiant energy-producing device, pulsing at a predetermined interval, means for producing a signal pulse in response to the pulsed radiant energy under predetermined conditions, means responsive to a predetermined number greater than one of produced signal pulses to provide an output signal, and means responsive to each signal pulse to decrease the interval to the next light pulse to less than that of the predetermined interval.

2. A smoke detector, comprising a pulse generator, a light source intermittently energized by the pulse generator, means responsive to the illumination of smoke by the light source to produce an energy pulse, and means responsive to a predetermined number of said energy pulses to produce an alarm signal, said pulse generator energizing said light source at a predetermined slow rate when no smoke is present, and means responsive to an energy pulse produced by the illumination of smoke to shorten the time to the next pulse to the light source.

3. In a smoke detector of the type utilizing photoelectric detection of light reflected from smoke particles and having a light source, first means energizing said light source by individual pulses, second means producing energy pulses in response to light pulses reflected from smoke particles, and third means responsive to a predetermined number in excess of one said energy pulses to produce an alarm signal, in which said first means produces pulses with a predetermined time therebetween when no smoke is present, the improvement comprising means responsive to an energy pulse produced by said second means during any light pulse to shorten the time to the following pulse.

4. A detector, comprising a radiant energy-producing device, means pulsing said device at a predetermined rate to produce radiant energy pulses, means producing a signal pulse in response to the pulsed radiant energy under predetermined conditions, a bi-stable switching device receiving the signal pulses, said bi-stable switching device normally being in a first condition in which it does not produce an output signal and being responsive to a signal pulse to shift to a second condition to produce an output signal, integrator means receiving the bi-stable switching means output, said integrator being responsive to a predetermined number of bi-stable switching device output signals in a specified time to produce an alarm signal, means returning the bi-stable switching device to the first condition after each signal pulse, and means responsive to an output signal from the bi-stable switching device to increase substantially the rate of the pulsing means.

* * * * *